United States Patent [19]

Turski

[11] Patent Number: 5,437,006
[45] Date of Patent: Jul. 25, 1995

[54] SPREADSHEET COMMAND/FUNCTION CAPABILITY FROM A DYNAMIC-LINK LIBRARY

[75] Inventor: Andrzej Turski, Redmond, Wash.

[73] Assignee: Microsoft Corporation, Redmond, Wash.

[21] Appl. No.: 9,919

[22] Filed: Jan. 27, 1993

[51] Int. Cl.⁶ .............................................. G06F 15/62
[52] U.S. Cl. ..................................... 395/155; 395/650
[58] Field of Search ............... 395/155, 156, 158, 160, 395/161, 148, 149, 650, 145

[56] References Cited

U.S. PATENT DOCUMENTS

| | | | |
|---|---|---|---|
| 5,175,854 | 12/1992 | Cheung et al. | 395/650 |
| 5,212,787 | 5/1993 | Baker et al. | 395/600 |
| 5,212,788 | 5/1993 | Lomat et al. | 395/600 |
| 5,247,681 | 9/1993 | Janis et al. | 364/DIG. 1 |
| 5,255,356 | 10/1993 | Michelman et al. | 395/148 |

*Primary Examiner*—Mark R. Powell
*Assistant Examiner*—Huynh Ba
*Attorney, Agent, or Firm*—Seed and Berry

[57] ABSTRACT

A data processing system executes a spreadsheet program that supports callbacks from dynamic-link libraries. The dynamic-link libraries may callback into the spreadsheet program through an entry point provided in the spreadsheet program. These callbacks allow execution of spreadsheet program functions and commands from within the dynamic-link library. The ability to callback to the spreadsheet program from the dynamic-link library results in substantial savings in time and memory space.

11 Claims, 10 Drawing Sheets

SPREADSHEET COMMAND/FUNCTION CAPABILITY FROM A DYNAMIC-LINK LIBRARY

TECHNICAL FIELD

The present invention relates generally to data processing systems and, more particularly, to calling of spreadsheet commands and functions from within a dynamic-link library.

BACKGROUND OF THE INVENTION

Many spreadsheet programs provide a macro language which allows users to develop macros for their individual use. Two types of macros are generally available within spreadsheet programs. First, "command macros" are available to perform particular tasks. Command macros are series of instructions which are equivalent to commands that are executed in response to user actions, such as a keystroke, mouse action or pointing device action. The instructions are stored in a structure known as a macro sheet. The instructions on the macro sheet are then interpreted when the user desires to execute the command macro. Second, "function macros" are available to allow the user to create custom functions. Function macros differ from command macros in that function macros return a value, rather than merely performing actions like command macros. Moreover, function macros cannot change variables that change the state of the spreadsheet program, whereas commands have such a capability.

Macros have proven useful but do not have an extensive enough range of capabilities to fully meet the demands of spreadsheet program users. In particular, users have demanded that they be able to call tasks outside of the spreadsheet program. An example of such a task is a system call to open an external file. In response to user demands, many spreadsheet programs have been modified to provide dynamic-link library (DLL) modules that perform the desired external tasks, like system calls. The addition of DLLs has greatly enhanced the range of functions available to the spreadsheet program user. Unfortunately, the DLLs cannot callback into the spreadsheet program to perform spreadsheet program commands or functions.

One attempt to overcome this limitation has been to incorporate the code for executing a spreadsheet command or function directly into a DLL. Including the added code in the DLL, however, is quite cumbersome and often requires redundant duplication of command and function code across multiple DLLs. Furthermore, the inclusion of this added code to the DLL does not provide a capability to callback into the spreadsheet program.

SUMMARY OF THE INVENTION

It is, therefore, an object of the present invention to provide a mechanism that allows spreadsheet program commands and functions to be called from a dynamic-link library.

It is a further object of the present invention to allow spreadsheet program functions and commands to be called from a dynamic-link library without incurring substantial overhead.

In accordance with a first aspect of the present invention, a method is practiced in a data processing system having a memory that holds a spreadsheet program and an operating system with a dynamic-link library. The data processing system also includes a processing means for executing the spreadsheet program and the operating system. In this method, a spreadsheet program is executed on the processing means. The dynamic-link library is called from the spreadsheet program. Execution of the dynamic-link library then begins. An entry point is provided in the spreadsheet program for a callback from the dynamic-link library to perform requested activities. A callback is made from the dynamic-link library to the entry point in order to perform the requested activities in the spreadsheet program. Execution of the dynamic-link library is then completed on the processing means.

The requested activities may be a spreadsheet command or, alternatively, a spreadsheet function. Furthermore, the method may include the additional steps of providing a hidden macro sheet and making it appear that the spreadsheet command originated from the hidden macro sheet. Still further, the spreadsheet program may maintain state information, and the method may include the additional step of manipulating the state information kept by the spreadsheet program to give the appearance that the callback originated from the spreadsheet program. The spreadsheet program may include a user interface, and the step of calling the dynamic-link library from the spreadsheet program may further comprise the step of generating a request from the user interface of the spreadsheet program to call the dynamic-link library.

The spreadsheet program may include an internal dispatch routine. The step of calling the dynamic-link library may involve calling the internal dispatch routine a first time and the step of making a callback may involve calling the internal dispatch routine a second time. Hence, the callback mechanism may involve recursive calls to the internal dispatch routine.

In accordance with another aspect of the present invention, a method is practiced in a data processing system having a memory that holds a dynamic-link library. The data processing system further includes a processing means for executing a spreadsheet program having a spreadsheet macro sheet that is not visible to a user. In this method, the dynamic-link library is executed on the processing means. A callback is then generated to the spreadsheet program from the dynamic-link library to execute a spreadsheet program command. An emulation is performed in the spreadsheet program to give the appearance that the callback originated from the spreadsheet macro sheet. The spreadsheet program command is then executed as if it originated from a spreadsheet macro.

In this method, the step of emulating in the spreadsheet program that the callback originated from a spreadsheet macro may include the step of setting the hidden macro sheet as a currently active macro sheet for the spreadsheet program. The step of emulating to give the appearance that the callback originated from a spreadsheet macro sheet may comprise the step of manipulating state information maintained by the spreadsheet program. More particularly, state variables that maintain the state information may be set to give the appearance that the call originated from the spreadsheet macro sheet.

In accordance with yet another aspect of the present invention, a data processing system includes a memory that holds a dynamic-link library and a spreadsheet program. The spreadsheet program includes an entry point for calling back from the dynamic-link library and code for executing spreadsheet program commands and functions. The data processing system also includes a processing means. The processing means includes a means for calling the dynamic-link library while executing the spreadsheet program. The processing may also include a means for using the entry point in the spreadsheet program to reinitiate execution of the spreadsheet program. Still further, the processing means includes a means for executing the code for executing spreadsheet program commands and functions in response to a callback from the dynamic-link library.

BRIEF DESCRIPTION OF THE DRAWINGS

A preferred embodiment of the present invention will be described below with reference to the drawings. The drawings include the following figures.

DETAILED DESCRIPTION OF THE INVENTION

A preferred embodiment of the present invention provides an interface between dynamic-link libraries (DLLs) and a spreadsheet program that allows spreadsheet commands and functions to be called from the DLLs. This interface supports two major functionalities: the ability of DLLs to callback into the spreadsheet functions and the ability of spreadsheet functions and commands to support calls originating from DLLs.

The preferred embodiment described herein may be implemented in code as software or firmware. The preferred embodiment is described as an application program interface (API) for a spreadsheet program. An API serves as interface between a custom DLL and a host application. Those skilled in the art will, nevertheless, appreciate that alternative embodiments of the present invention may be implemented by mechanisms other than an API. For illustrative purposes, the preferred embodiment will be discussed below relative to the Microsoft Excel, version 4.0, spreadsheet program sold by Microsoft Corporation of Redmond, Wash.

Figure 1:
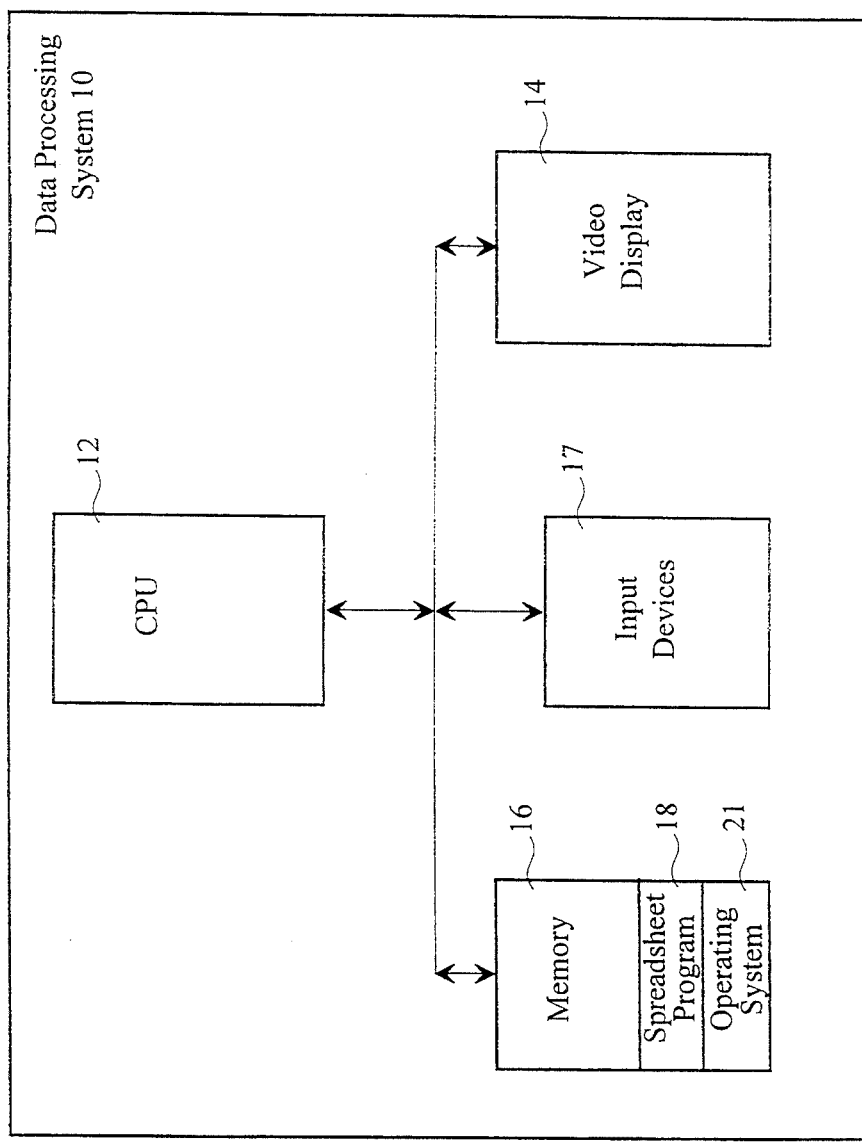
FIG. 1 a block diagram of a data processing system for implementing a preferred embodiment of the present invention.

FIG. 1 is a block diagram illustrating a data processing system that is suitable for practicing the preferred embodiment of the present invention described herein. It should be appreciated that the illustrated data processing system 10 is merely an example system and that other data processing system configurations may be used for practicing the present invention. The data processing system 10 includes a central processing unit (CPU) 12 that communicates with a memory 16 and a video display 14. The memory 16 holds a spreadsheet program 18, that includes the API for the preferred embodiment of the present invention, and an operating system 21. The video display 14 displays images, such as those generated by the spreadsheet program when it is executing on the CPU 12. The data processing system 10 also includes input devices 17, such as a keyboard and a mouse, for communicating user actions to the system.

As was mentioned above, the preferred embodiment of the present invention allows DLLs to callback into the spreadsheet program. To support this capability, the preferred embodiment provides an entry point for DLLs to callback into the spreadsheet program. Moreover, in order to support calls from DLLs, the preferred embodiment manipulates state information maintained by the spreadsheet program 18 in state variables so that the calls do not appear to originate from DLLs. The support for callbacks into the spreadsheet program from DLLs is integrated into the existing spreadsheet program framework.

In order to understand how the preferred embodiment of the present invention provides the capability for commands and functions to be called from a DLL, it is helpful to look at how calls to commands and functions are handled from within the spreadsheet program by the system 10 of FIG. 1. The preferred embodiment does not change how conventional calls are made, but, rather, adds the additional capability to make callbacks to the spreadsheet program from DLLs without affecting conventional calls.

Figure 2A:
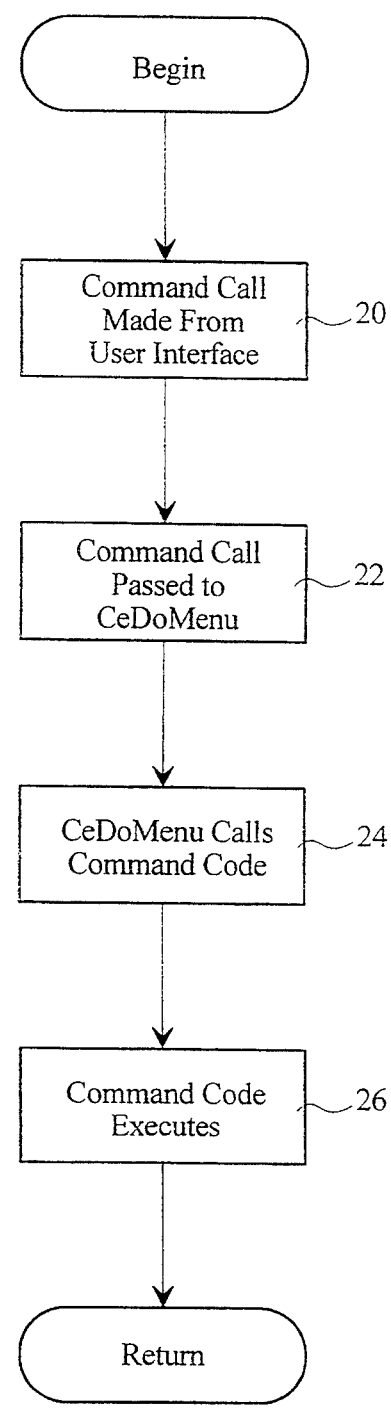
FIG. 2a is a flowchart of the steps performed in the preferred embodiment of FIG. 1 for a spreadsheet command call originating from a user interface of a spreadsheet program.
Figure 2B:
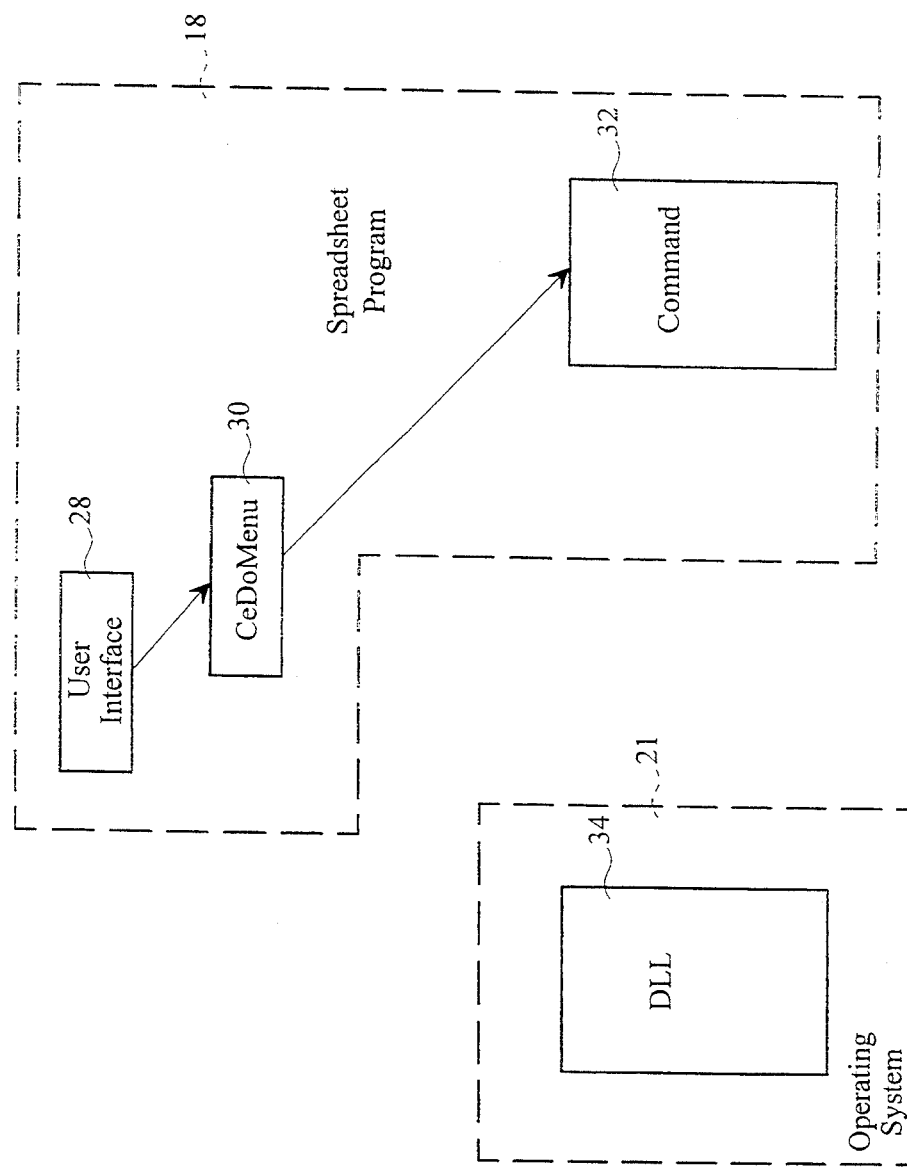
FIG. 2b is a block diagram of components of the spreadsheet program and the operating system of FIG. 1 when a call to a spreadsheet command is made from a user interface of the spreadsheet program in the preferred embodiment of the present invention described herein.

FIG. 2a is a flowchart of the steps performed in the preferred embodiment described herein for a call to a command originating from within the user interface of the spreadsheet program 18 (FIG. 2a). The flowchart of FIG. 2a will be described in conjunction with the block diagram of FIG. 2b. The block diagram in FIG. 2b shows the components in the spreadsheet program 18 and the operating system 21 that are called for a command call from the user interface. Spreadsheet program 18 includes a user interface 28 that is responsible for providing the user interface of the spreadsheet program. Initially, a call to a command is generated from the user interface 28 (FIG. 2b) (step 20 in FIG. 2a). For instance, commands may be associated with certain keystrokes or objects provided by the user interface. The user may call such commands by pressing a key, clicking the object with a mouse or selecting a command name on a menu. This command call is passed to the CeDoMenu routine 30 (FIG. 2b) (step 22 in FIG. 2a). The CeDoMenu routine 30 is a dispatch routine for dispatching Excel spreadsheet commands to the appropriate command code 32 (step 24 in FIG. 2a). Since the command has been called from the user interface 28, no parameters are passed to the command code 32. Once called, the command code 32 executes and performs the requested command (step 26).

Figure 3A:
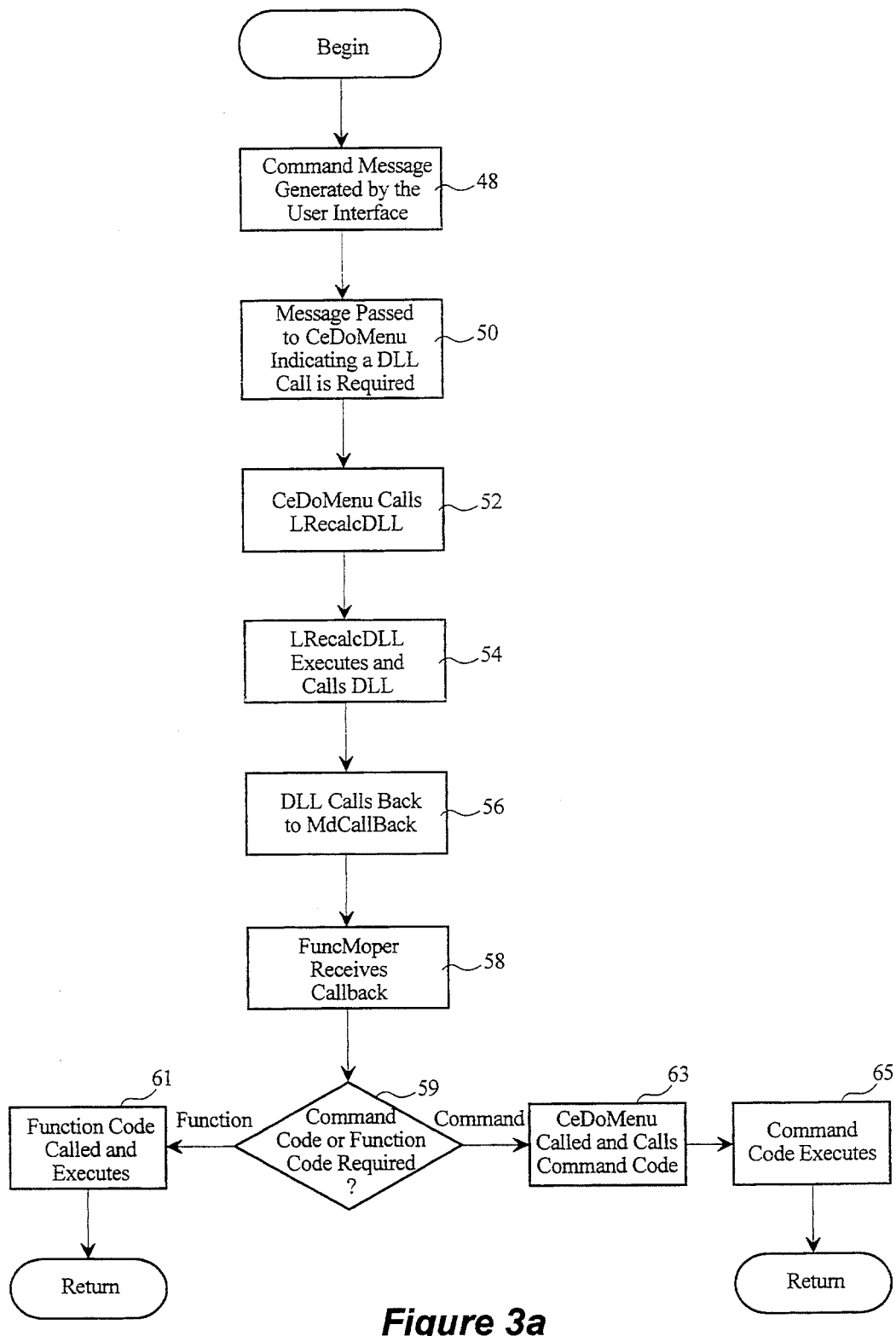
FIG. 3a is a flowchart of the steps performed in the preferred embodiment of the present invention when a command call is made into a DLL and the DLL calls back to execute spreadsheet command or function code.

FIG. 3a shows the steps performed by the preferred embodiment when a command results in a call to a DLL and the DLL calls back into the host spreadsheet program (i.e., a DLL command). A comparison with the flowchart of FIG. 2a indicates a number of differences in the two types of command calls (conventional calls and DLL calls). A primary difference is that the function or command call from the DLL requires an entry point and a callback, whereas the conventional command call does not. The steps of the flowchart of FIG. 3a will now be described with reference to the block diagram shown in FIG. 3b.

Initially, a command message is generated by the user interface 28 (FIG. 3b) (step 48 in FIG. 3a). The message is then passed to the dispatch routine CeDoMenu 30 (FIG. 3b), which recognizes the message as a DLL call (step 50 in FIG. 3a ). The CeDoMenu routine 30 (FIG. 3b) calls a routine 34 known as LRecalcDLL in the Microsoft Excel, version 4.0, spreadsheet program. LRecalcDLL routine is responsible for preparing the state information maintained by the spreadsheet command and functions in a callback from a DLL (FIG. 3b) (step 52 in FIG. 3a). The LRecalcDLL routine 34 (FIG. 3b) executes and calls the DLL 36 that is requested in the DLL command call (step 54 in FIG. 3a).

Figure 3B:
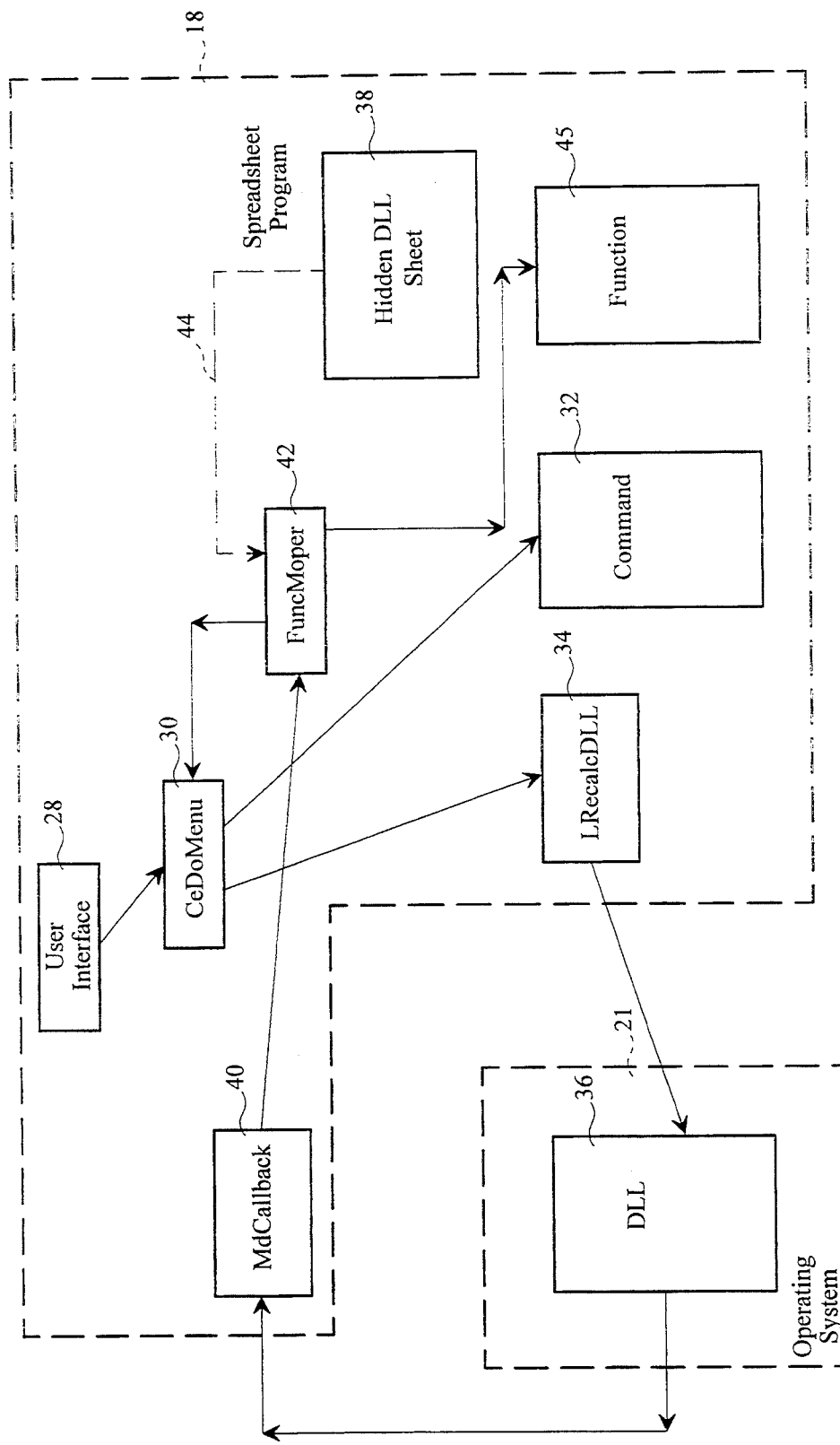
FIG. 3b is a block diagram illustrating the components of the spreadsheet program and the operating system of FIG. 1 that are used when a command call is made into a DLL and the DLL calls back to execute spreadsheet command or function code in the preferred embodiment of the present invention.
Figure 6:
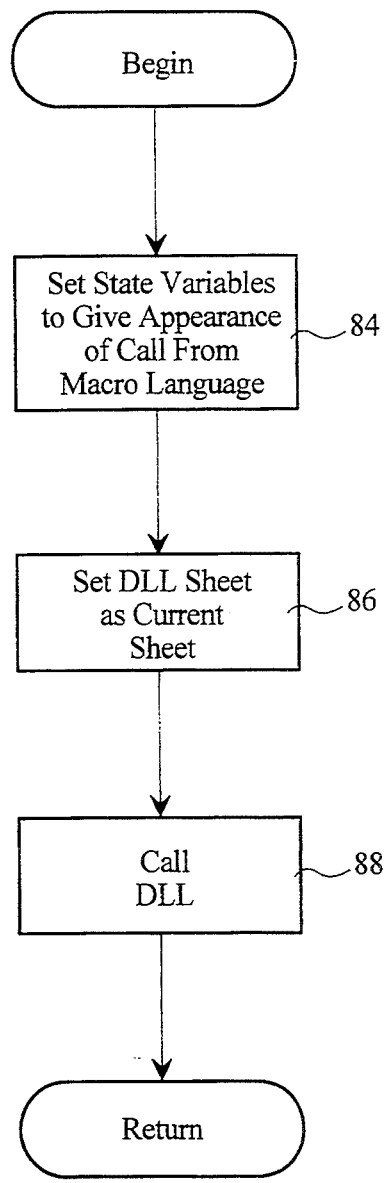
FIG. 6 is a flowchart illustrating the steps performed by the LRecalcDLL routine of the preferred embodiment of the present invention.

As mentioned above, the LRecalcDLL routine 34 (FIG. 3b) is responsible for changing the current state of the spreadsheet program 18 (FIG. 1) to make the call appear that it originated from the macro language. The changing of the state is necessary because certain commands may only be executed if called from the macro language and a macro sheet is active. FIG. 6 is a flowchart depicting the steps performed by the LRecalcDLL routine 34 (FIG. 3b). Specifically, the LRecalcDLL routine sets state variables provided within the spreadsheet program 18 for the current state such that the state variables tell the program that the call originated from the macro language (step 84 in FIG. 6). The LRecalcDLL routine 34 also sets a hidden DLL macro sheet 38 as the current sheet from which the command originated (step 86 in FIG. 6). The hidden DLL macro sheet 38 is provided by the spreadsheet program 18 and is generated the first time that it is required. The hidden DLL macro sheet 38 has no window and no cells, and thus, the hidden DLL macro sheet 38 is not visible to the user. In addition, the hidden DLL macro sheet 38 is never deleted once it is created (but the hidden DLL macro sheet is never saved on disk). It should be noted that although the hidden DLL macro sheet 38 is provided, the spreadsheet command is not executed by interpreting the hidden macro sheet; rather, the command is already known without interpretation, so that the command routine 32 (FIG. 3b) may be called directly. Once the state variables are set and the hidden DLL macro sheet 38 is designated as the current macro sheet, the DLL 36 is called (step 88 in FIG. 6). The call to the DLL 36 may be made through a separate routine other than LRecalcDLL 34.

The DLL 36 calls back to an entry point routine 40 (FIG. 3b), MdCallback (step 56 in FIG. 3a). The MdCallback routine 40 (FIG. 3b) provides an entry point for the DLL 36 to callback to the spreadsheet program 18. The command call from within the DLL 36 is then passed to a distributor routine 42, known as FuncMoper. The FuncMoper routine 42 is provided to distribute messages to appropriate destinations. The FuncMoper routine 42 receives the callback from the DLL 36 and calls the appropriate function code 45 (steps 59 and 61) or it calls CeDoMenu 30, which, in turn, calls the appropriate (steps 59 and 63) command routine 32 (step 58 in FIG. 3a). If the function code 45 is called, the function code executes to perform the desired function (see step 61). On the other hand, if the command code is called, the command code executes to perform the desired command (see step 63). The broken line 44 leading from the hidden DLL macro sheet 38 to the FuncMoper distributor routine 42 in FIG. 3b indicates that the spreadsheet program 18 believes the command originated from the hidden DLL macro sheet 38. A number of nested function or command calls may be provided within a single DLL.

Figure 4A:
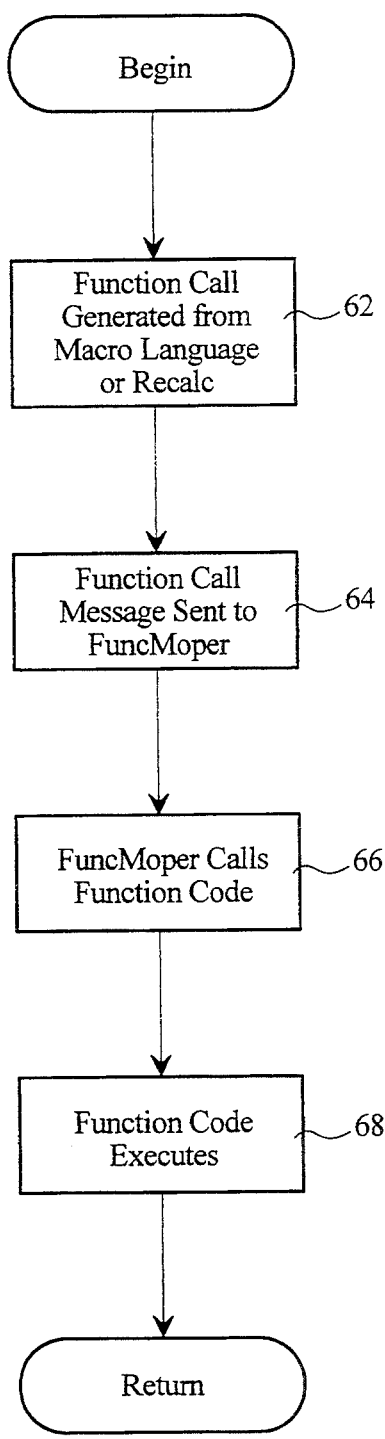
FIG. 4a is a flowchart illustrating the steps performed by the preferred embodiment of the present invention when a spreadsheet function call is made from the spreadsheet program.
Figure 4B:
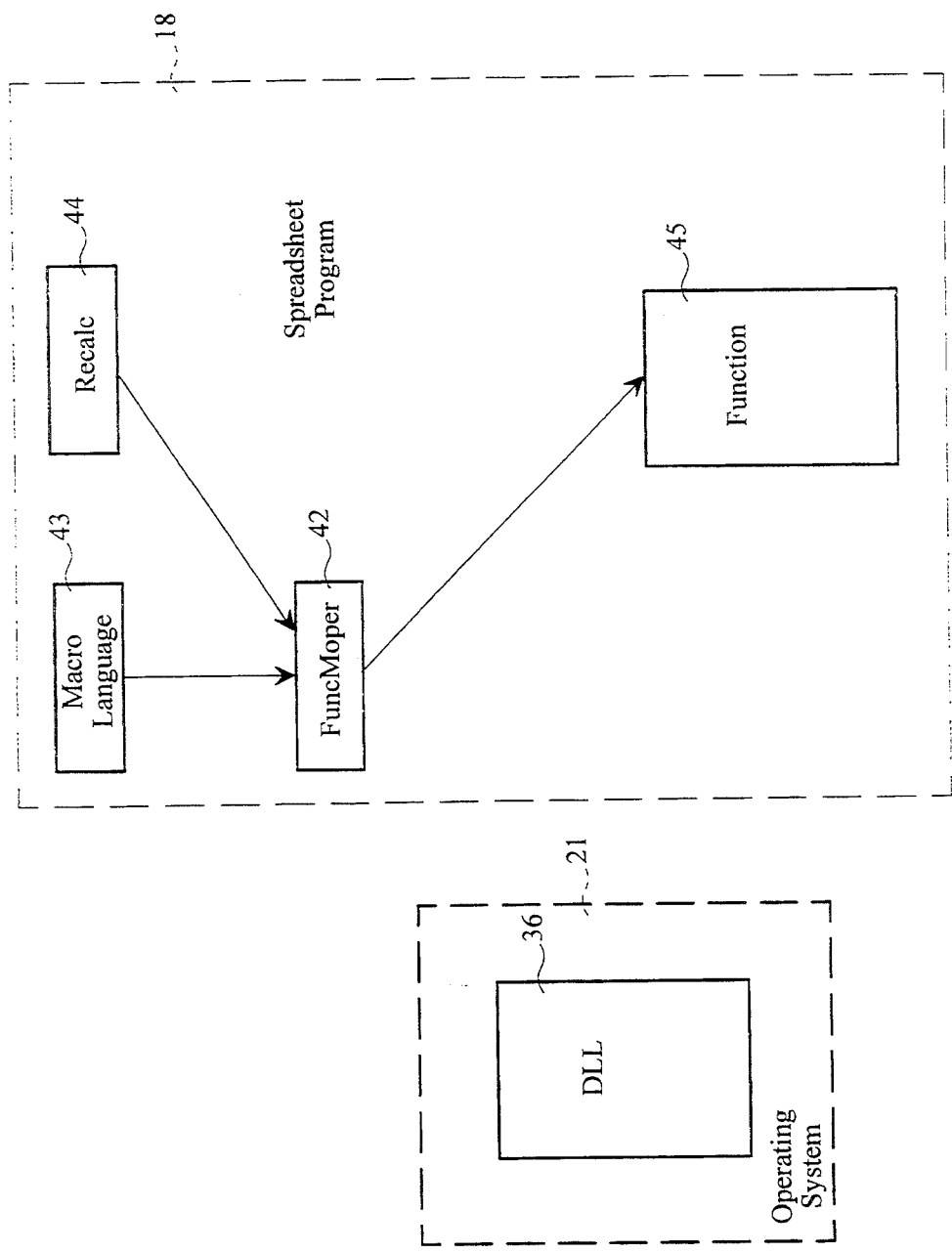
FIG. 4b is a block diagram illustrating components of the spreadsheet program and operating system of FIG. 1 that are called when a conventional spreadsheet function call is made.

The above description is focused on how the preferred embodiment of the present invention described facilitates DLL command calls from the user interface 28. The preferred embodiment of the present invention described herein also supports function calls from within the spreadsheet program and function calls into a DLL that calls back to function code 45. As a starting point, it is helpful to consider how a spreadsheet program function call originates from the spreadsheet program. FIG. 4a is a flowchart showing the steps performed by the preferred embodiment described herein for a spreadsheet function call that originates from the spreadsheet program, and it will now be described in conjunction with the block diagram of FIG. 4b. A function call is generated from the macro language 43 (FIG. 4b) or the recalculation section 44 of the spreadsheet program 18 (step 62 in FIG. 4a). The macro language 43 supports the use of macros in the spreadsheet program 63, whereas the recalculation section 44 is responsible for calculating values held in cells of a spreadsheet. A function call message is sent in response to the FuncMoper distributor routine 42 (FIG. 4b) (step 64 in FIG. 4a). The FuncMoper routine 42 (FIG. 4b) calls the proper function 45 (step 66 in FIG. 4a), and the function code 45 (FIG. 4b) then executes (step 68 in FIG. 4a).

Figure 5A:
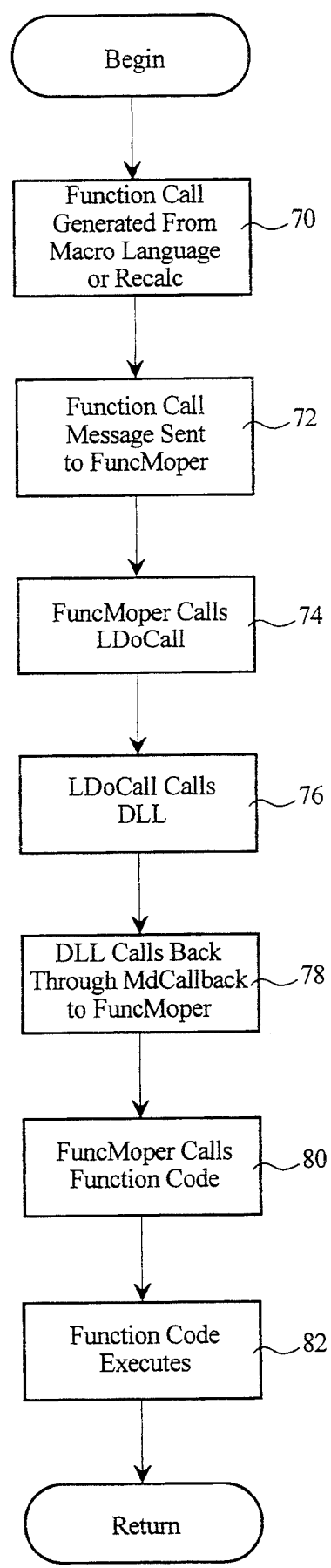
FIG. 5a is a flowchart illustrating the steps performed when a spreadsheet function call is made into a DLL and the DLL calls back to execute spreadsheet function code.
Figure 5B:
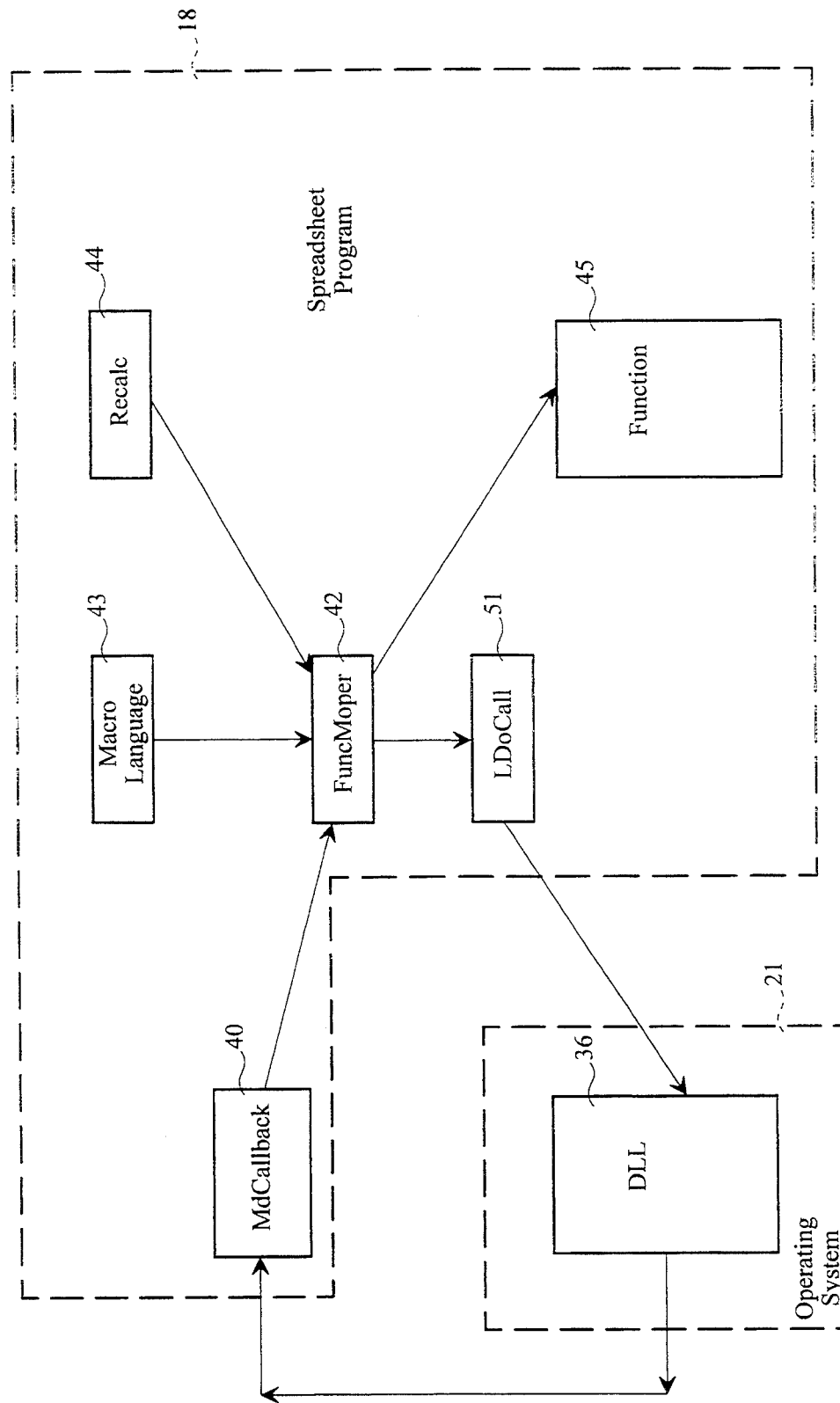
FIG. 5b is a block diagram illustrating components of the spreadsheet program and the operating system of FIG. 1 that are called when a spreadsheet function call is made from a DLL.

The handling of function calls originating as calls into a DLL differs from the above-described approach of FIG. 4a that handles function calls from within the spreadsheet program 18. FIG. 5a shows a flowchart of the steps performed by the preferred embodiment described herein to handle a DLL function call. The steps of FIG. 5a will now be described with reference to the block diagram of FIG. 5b.

A function call is generated from the macro language 43 (FIG. 5b) or the recalculation section 44 of the spreadsheet program 18 (step 70 in FIG. 5a). The call is then passed to the FuncMoper dispatch routine 42 (step 72 in FIG. 5a). The FuncMoper routine 42 recognizes that the call is a DLL function call and calls the LDoCall routine 51, which is responsible for calling the DLL 36 (step 74 in FIG. 5a). LDoCall 51 (FIG. 5b) then calls the DLL 36 (step 76 in FIG. 5a).

The DLL 36 (FIG. 5b) then begins execution and calls back through the MdCallback entry point routine 40 to the FuncMoper distributor routine 42 (step 78 in FIG. 5a). The FuncMoper distributor routine 42 (FIG. 5) calls the function 45 (step 80 in FIG. 5a), and the function is performed (step 82 in FIG. 5a).

Thus, the preferred embodiment of the present invention preserves the ability to call commands and functions from within the spreadsheet program, but it also provides the ability to call spreadsheet commands and functions from within a DLL. The ability to call spreadsheet functions and commands from within a DLL saves time by eliminating the need to first exit the DLL before making such calls and broadens the range of capabilities of DLLs provided for the spreadsheet program. The code for supporting calls from DLLs is integrated into existing spreadsheet program structure.

While the present invention has been described with reference to a preferred embodiment thereof, those skilled in the art will appreciate that various changes in form and scope may be made without departing from the spirit of the present invention as defined in the appended claims.

I claim:

1. In a data processing system having a memory that holds a spreadsheet program and an operating system with a dynamic-link library and a processing means that executes the spreadsheet program and the operating system, a method comprising the computer implemented steps of:
   a) executing the spreadsheet program on the processing means;
   b) calling the dynamic-link library from the executing spreadsheet program;
   c) beginning execution of the dynamic-link library on the processing means;
   d) providing an entry point in the spreadsheet program to support a callback from the dynamic-link library to the spreadsheet program to request the spreadsheet program to perform requested activities;
   e) making a callback in the dynamic-link library from the dynamic-link library to the entry point in the spreadsheet program in order to perform the requested activities in the spreadsheet program;
   f) in response to the callback, performing the requested activities by the spreadsheet program; and
   g) completing execution of the dynamic-link library on the processing means.

2. A method as recited in claim 1 wherein the requested activities include a spreadsheet function.

3. A method as recited in claim 1 wherein the requested activities include a spreadsheet command.

4. A method as recited in claim 3, further comprising the steps of providing a hidden macro sheet maintaining information specifying a currently active macro sheet and setting the information to indicate that currently active macro sheet is the hidden macro sheet.

5. A method as recited in claim 3 wherein the spreadsheet program maintains state information that identifies from where the spreadsheet command originated and said method further comprising the step of manipulating the state information maintained by the spreadsheet program to identify that the spreadsheet command originated from within the spreadsheet program.

6. A method as recited in claim 1 wherein the spreadsheet program has a user interface and the step of calling the dynamic-link library from the executing spreadsheet program further comprises the step of generating a request from the user interface to call the dynamic-link library.

7. A method as recited in claim 1 wherein spreadsheet program includes an internal dispatch routine, wherein the step of calling the dynamic-link library further comprises the step of calling the internal dispatch routine a first time and wherein the step of making a callback further comprises the step of calling the internal dispatch program a second time.

8. In a data processing system having a memory holding a dynamic-link library and a processing means executing a spreadsheet program with a spreadsheet macro sheet that is not visible to a user of the spreadsheet program, said spreadsheet program being responsive to commands and maintaining state information that indicates from where the commands originate, a method comprising the steps of:
   a) executing the spreadsheet program on the processing means;
   b) calling the dynamic-link library from the executing spreadsheet program on the processing means;
   c) generating a callback or entry point in the spreadsheet program from the dynamic-link library to execute a selected spreadsheet program command;
   d) setting state information maintained by the spreadsheet program to indicate that the callback originated from the spreadsheet macro sheet; and
   e) performing the selected spreadsheet program command.

9. A method as recited in claim 8 wherein the step of emulating in the spreadsheet program to give the appearance that the callback originated from the spreadsheet macro sheet, further comprises the step of:
   setting the macro sheet as a currently active macro sheet for the spreadsheet program.

10. A method as recited in claim 8 wherein the spreadsheet program maintains state information and the step of emulating the spreadsheet program to give the appearance that the callback originated from the spreadsheet macro sheet, further comprises the step of:
    manipulating the state information that is maintained by the spreadsheet program to give the appearance that the callback originated from the spreadsheet macro sheet.

11. A method as recited in claim 10 wherein the state information is maintained by state variables and the step of manipulating state information kept by spreadsheet macro further comprises the step of:
    setting the state variables in the spreadsheet program to give the appearance that the callback originated from the spreadsheet macro sheet.

* * * * *

UNITED STATES PATENT AND TRADEMARK OFFICE
CERTIFICATE OF CORRECTION

PATENT NO.    :   5,437,006
DATED         :   July 25, 1995
INVENTOR(S)   :   Andrzej Turski It is certified that error appears in the above identified patent and that said Letters Patent is hereby corrected as shown below:

On the cover page under item [54], after "COMMAND/FUNCTION" and before "CAPABILITY", please insert --CALLBACK--.

Signed and Sealed this

Seventh Day of November, 1995

Attest:

BRUCE LEHMAN

Attesting Officer            Commissioner of Patents and Trademarks